Jan. 27, 1970  W. T. SHERWOOD  3,492,060
PROJECTION SCREEN
Filed March 8, 1967

WILLIAM T. SHERWOOD
INVENTOR.
BY William F. Delaney Jr.
Robert W Hampton
ATTORNEYS United States Patent Office 3,492,060
Patented Jan. 27, 1970

3,492,060
PROJECTION SCREEN
William T. Sherwood, Rochester, N.Y., assignor to Eastman Kodak Company, Rochester, N.Y., a corporation of New Jersey
Filed Mar. 8, 1967, Ser. No. 621,564
Int. Cl. G03b *21/56*
U.S. Cl. 350—117                                   13 Claims

ABSTRACT OF THE DISCLOSURE

A front projection screen has a wide effective viewing angle. A front sheet diffusely transmits projected light onto a rear sheet having a vertically corrugated reflective front surface. Only the ridges of the corrugated surface contact the front sheet, thereby effectively spreading the reflected light horizontally.

BACKGROUND OF THE INVENTION

This invention relates to a projection screen, and more particularly to a brilliant front projection screen having a wide viewing angle.

Early wide angle front projection screens wasted a large part of light received from projection sources. This was due in part to their undesirable reflection of the light vertically above and below a horizontally distributed audience. Such undesirable reflection was even more serious during daylight projection than during projection in a darkened room.

U.S. Patent No. 2,660,927 illustrates the attempts made in the prior art to reduce the vertical spread of light reflected from such screens, while maintaining a sufficient horizontal spread to include a normal viewing audience. This patent discloses a screen comprising a transparent sheet, having a roughened front surface for receiving and diffusing projected light and having a vertically ribbed, mirror-plated rear surface for reflecting the light while spreading it horizontally but not vertically. The slight amount of necessary vertical reflection is provided by the diffusing front surface of such screens. Although screens of this construction are effective within a viewing angle of approximately ±30°, their reflected images lose definition and uniformity of brightness at wider viewing angles.

Another type of prior art screen that produces similar results comprises a non-planar reflecting surface having a diffusing layer directly coated thereon, as disclosed, for example, in U.S. Patent 3,063,339.

SUMMARY OF THE INVENTION

It has been discovered that projection screens can be made more effective at wide angles by improving the uniformity of the thickness of the diffusing layer, and by substantially eliminating the deflection and internal reflection that normally occur at the front surface of such screens as the reflected light leaves the partially transparent layer in front of the reflective surface. It has also been discovered that both of these goals can be accomplished at reasonable cost by means of a novel composite screen structure having a diffusing sheet which is partially separated from the reflecting surface.

It is, therefore, an object of this invention to provide a front projection screen which produces a clear, uniformly bright image over an effective wide horizontal angle of view without wasting any substantial amount of light in vertical reflection above and below a horizontally distributed audience.

It is a further object of this invention to provide a wide angle front projection screen at reasonable cost having any desired directional reflection qualities within a range that is sufficient to include any normal audience distribution.

These and other objects are attained according to the present invention by a composite screen comprising a rear sheet having a vertically corrugated, substantially totally reflective front surface, and a front diffusing sheet which is adjacent to the rear sheet but in spaced relation with the grooves of the corrugated surface. Light projected onto this screen is diffusely transmitted by the front sheet and is reflected by the corrugated surface of the rear sheet, which surface spreads reflected light horizontally. The amount of vertical deflection is determined by the diffusion qualities of the front sheet.

The formation of the corrugations may be varied to suit any particular purpose or desired viewing area. For example, the corrugations could be convex or concave lenticules, or a sinusoidal wave. Convex lenticules are preferred; they may be cylindrical or non-cylindrical.

The front sheet may be mounted independently of the rear sheet. However, the front screen is preferably thin, approximately .012 inch, and not self-supporting. Therefore, it is advantageous to mount the front sheet on a self-supporting rear sheet. Attachments may be accomplished, for example, by mechanical connectors or retainers, or by adhesives.

The use of adhesive attachment between the two sheets provides an additional advantage. The relative transparency and thickness of the adhesive material affects the total diffusion of light transmitted through the front sheet. Therefore, during the manufacture of these screens, the desired amount of vertical deflection can be selectively predetermined by the choice of adhesive material and thickness, and by the control of the smoothness of its exposed surface.

As indicated above, the terms "horizontal" and "vertical" refer to relative orientations with respect to the screen surface, which is assumed for convenience to be mounted substantially vertically for viewing by a usual audience distribution extending more horizontally than vertically. Thus, by way of example, the screen is described with respect to its preferred usage.

BRIEF DESCRIPTION OF THE DRAWINGS

In the drawings in which the same numbers are used to identify corresponding elements in all the figures.

DESCRIPTION OF THE PREFERRED EMBODIMENTS

Figure 1:
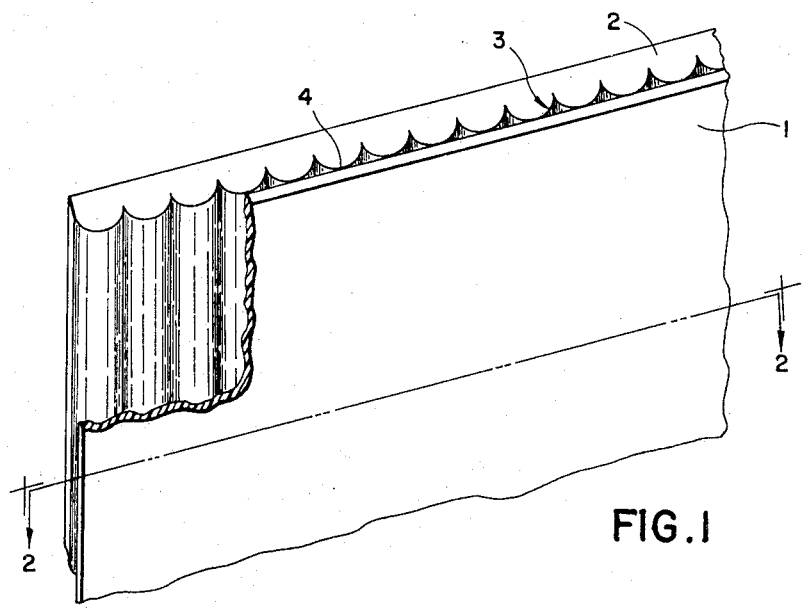
FIG. 1 is a perspective view of a portion of a front projection screen made in accordance with the invention.

As seen in FIG. 1 a screen constructed according to this invention comprises at least two distinct sheets 1 and 2. The front sheet 1 is translucent so that substantially all incident light is diffusely transmitted to the rear sheet 2. The rear sheet 2 has a front corrugated surface 3 which is composed of a plurality of vertically parallel ridges 4 and grooves 5. This corrugated front screen surface 3 of sheet 2 is made substantially specularly reflective, so that all light projected through sheet 1 is reflected back through sheet 1 to the audience. The corrugated reflective surface 3 spreads the reflected light in a horizontal direction up to approximately ±50° with substantially no vertical spread. The front sheet slightly diffuses transmitted light up to approximately ±5° in each transmission. Since the projected light passes through sheet 1 twice, the diffusion caused by sheet 1 provides an additional 10° of horizontal spread and introduces a vertical spread of ±10°. This limited vertical spread is necessary to provide a visible reflected image which may be viewed from an audience area having a substantial depth. If the reflective surface is slightly diffusing, then the front sheet should have correspondingly less diffusing qualities so that the total desired diffusion is obtained.

Figure 2:
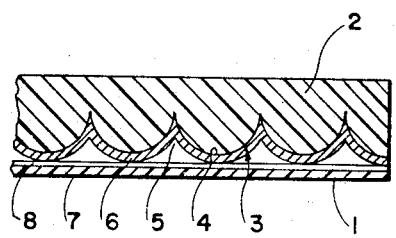
FIG. 2 is a cross-section taken along line 2—2 of an alternative embodiment of FIG. 1.

The rear sheet 2 may itself be a reflective material, or its front surface may be coated with a reflective layer 6, as seen in FIG. 2. Although it is not essential to the practice of this invention, rear sheet 2 preferably is sufficiently rigid to be self-supporting.

The front sheet may be made diffusing in any desired manner. Either surface of sheet 1 may be roughened to provide diffusion, but preferably the front surface 7 is roughened to reduce glare as well as diffuse incident light. Alternatively, the front sheet could be made of a diffusing material, rather than having a roughened surface. One such material is translucent plasticized polyvinyl chloride.

The front sheet 1 may be mounted in front of the rear sheet 2 in any desired manner. In one embodiment of the present invention, as seen in FIG. 2, the rear surface of sheet 1 is coated with a translucent layer of adhesive lacquer 8 which adheres to the tops of the ridges 4. Since the diffusion characteristic of the front sheet 1 is effected by the adhesive material and thickness, a manufacturing control is provided in the selection of a sheet and coating combination which will effect the desired amount of diffusion. For example, the front sheet may be less diffusing than is necessary for the particular vertical spread desired. The material, thickness and smoothness of the adhesive coating are selected to increase the total diffusion as required. A translucent adhesive resinous lacquer coating 8 can be employed to reduce the amount of diffusion caused by an uncoated sheet 1, since some lacquers are less diffusing and have smoother surfaces than translucent plasticized polyvinyl chlorides.

Figure 3:
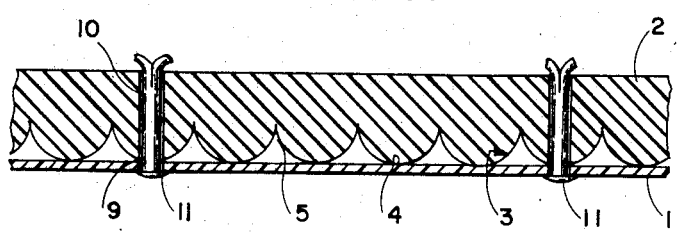
FIGS. 3 and 4 are fragmentary sections similar to FIG. 2 showing further alternative embodiments of the invention.

If sheet 1 is relatively rigid, an alternative method of attaching sheet 1 to sheet 2 is by means of mechanical retainers. For example, as seen in FIG. 3, sheets 1 and 2 can be provided with a plurality of corresponding holes 9 and 10, respectively, through which retaining pins 11 pass. Preferably, these pins would be located outside the area of projection, so as not to interfere with the image.

Figure 4:
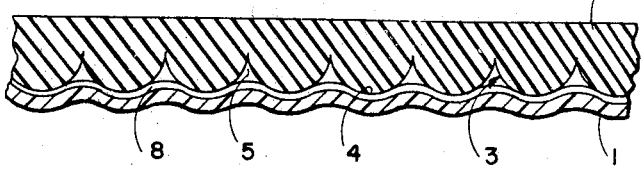

It is not required in the practice of this invention that sheet 1 be absolutely flat. As seen in FIG. 4, a flexible translucent sheet 1, coated with a translucent lacquer 8, overlies the front corrugated reflective surface 3 of sheet 2. Sheet 1 contacts the tops of the ridges of the corrugations 4 through the adhesively bonding layer. Because of its flexibility, sheet 1 sags in the grooves 5 between the ridges 4. No loss of optical efficiency is incurred because of the sag in the flexible front sheet 1.

The multiple parallel corrugations formed by the front surface 3 of rear sheet 2 are preferably cylindrical convex lenticules. However, other forms of corrugations which spread the light more horizontally than vertically may be used in the practice of this invention. For example, surface 3 may form sinusoidal undulations, or may be comprised of concave lenticules rather than convex lenticules. If convex lenticules are employed, it is preferable that each lenticule be cylindrical, and the arc of each lenticule subtend an angle of approrimately 60° at the center of that cylinder.

The size of the lenticules or rib projections 4 depends on the minimum audience distance. For use at close distances, for example 8–10 feet, the lenticules should be .033 inch wide with a radius of .033 inch.

The invention has been described in detail with particular reference to preferred embodiments thereof, but it will be understood that variations and modifications can be effected within the spirit and scope of the invention as described herein.

I claim:

1. A front projection screen comprising: a front translucent sheet for partially diffusing light transmitted therethrough; and a rear sheet having a corrugated, substantially totally reflective front screen surface formed of alternate ridges and grooves, said front sheet being adjacent to the ridges and spaced from the grooves of said corrugated reflective surface.

2. A front projection screen comprising a front translucent sheet for partially diffusing light transmitted therethrough; and a rear sheet having a vertically corrugated, substantially totally reflective front screen surface, formed of ridges and grooves, said front sheet contacting only the ridges of the corrugated reflective surface.

3. A front projection screen as claimed in claim 2, wherein the front sheet is attached to the ridges of the corrugations by means of an adhesive bond comprising a translucent resin.

4. A front projection screen comprising a rigid rear sheet having a corrugated, substantially totally reflective front screen surface formed of alternative ridges and grooves, and a flexible translucent front sheet having a translucent adhesive coating on its rear surface, said rear coated surface of said front sheet contacting only the ridges of the corrugated reflective surface, whereby the front sheet is adhesively bonded to said ridges.

5. A front projection screen comprising a front sheet for diffusely transmitting incident light, and a rear sheet having a substantially totally reflective front screen surface composed of a plurality of vertically parallel rib projections which spread the reflected light mostly horizontally, said front sheet being contiguous with only the front portions of the rib projections.

6. A front projection screen as claimed in claim 5, wherein the front sheet is attached to the front portions of the rib projections by a translucent adhesive resin coating on the rear surface of the front sheet.

7. A front projection screen comprising a front sheet for diffusely transmitting incident light, and a rear sheet adjacent to but at least partially separated from said front sheet, said rear sheet having a substantially totally reflective screen surface composed of a plurality of vertically parallel rib projections which spread reflected light mostly horizontally.

8. A front projection screen comprising: a front translucent sheet for partially diffusing light transmitted therethrough; and a rear sheet having a vertically lenticular, substantially totally reflective front screen surface, said front sheet being contiguous with only the front portions of the lenticules, whereby substantially all light entering said screen is reflected forwardly and horizontally, and loss by reflection vertically is minimized.

9. A front projection screen comprising a supporting sheet having a vertically lenticular, substantially totally reflective front screen surface and a flexible translucent sheet overlying the supporting sheet, said flexible translucent sheet being in adhesive contact with only the front portions of the lenticules.

10. A front projection screen comprising a front translucent sheet for diffusely transmitting incident light, and a rear sheet adjacent to but at least partially separated from said front sheet and having a vertically lenticular, substantially totally reflective screen surface.

11. A front projection screen comprising a translucent front sheet for diffusely transmitting incident light, and a rear sheet having a front, substantially totally reflective screen surface composed of a plurality of vertically parallel adjacent concave lenticular grooves forming ridge projections between each concave groove, said front sheet being in contact only with the ridge projections of the reflective surface.

12. A front projection screen as claimed in claim 11, wherein the front sheet is attached to the tops of the ridge projections by a translucent adhesive resin coating on the rear surface of the front sheet.

13. A composite front projection screen comprising two sheets, the front sheet being translucent and the rear sheet having a vertically corrugated substantially totally reflective front screen surface, formed of alternate ridges and grooves, said front sheet being in contact only with the ridges of the corrugated reflective surface, both sheets being curved in the vertical direction to compress the vertical spread of reflected light.

References Cited

UNITED STATES PATENTS

| 1,806,864 | 5/1931 | Pallemaerts | 350—127 XR |
| 2,036,146 | 3/1936 | Kampfer | 350—167 |
| 2,063,004 | 12/1936 | Louisot | 350—129 |
| 2,499,452 | 3/1950 | Bonnet | 350—167 |
| 2,914,657 | 11/1959 | Akely et al. | 240—41.36 XR |

FOREIGN PATENTS

| 489,617 | 7/1938 | Great Britain. |

NORTON ANSHER, Primary Examiner

DAVID S. STALLARD, Assistant Examiner